US011405265B2

United States Patent
Hughes et al.

(10) Patent No.: US 11,405,265 B2
(45) Date of Patent: *Aug. 2, 2022

(54) METHODS AND SYSTEMS FOR DETECTING PATH BREAK CONDITIONS WHILE MINIMIZING NETWORK OVERHEAD

(71) Applicant: HEWLETT PACKARD ENTERPRISE DEVELOPMENT LP, Houston, TX (US)

(72) Inventors: David Anthony Hughes, Los Altos Hills, CA (US); Lokesh Lingarajan, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,925

(22) Filed: Nov. 24, 2020

(65) Prior Publication Data

US 2021/0083932 A1 Mar. 18, 2021

Related U.S. Application Data

(63) Continuation of application No. 16/811,014, filed on Mar. 6, 2020, now Pat. No. 10,887,159, which is a
(Continued)

(51) Int. Cl.
*H04L 41/0686* (2022.01)
*H04L 43/0829* (2022.01)
(Continued)

(52) U.S. Cl.
CPC ...... *H04L 41/0686* (2013.01); *H04L 43/0841* (2013.01); *H04L 43/10* (2013.01); *H04L 43/04* (2013.01); *H04L 43/12* (2013.01)

(58) Field of Classification Search
CPC . H04L 41/0686; H04L 43/10; H04L 43/0841; H04L 43/04; H04L 43/12
See application file for complete search history.

(56) References Cited

U.S. PATENT DOCUMENTS

| 4,494,108 A | 1/1985 | Langdon et al. |
| 4,558,302 A | 12/1985 | Welch |

(Continued)

FOREIGN PATENT DOCUMENTS

| EP | 1507353 A2 | 2/2005 |
| JP | 05-061964 A | 3/1993 |
| WO | 01/35226 A1 | 5/2001 |

OTHER PUBLICATIONS

Definition appliance, 2c, Webster's Third New International Dictionary, Unabridged (1993), available at <http://lionreference.chadwyck.com> (Dictionaries/Webster's Dictionary).
(Continued)

*Primary Examiner* — Afshawn M Towfighi

(57) ABSTRACT

Disclosed herein are systems and methods for detection of a path break in a communication network by one network appliance of a plurality of network appliance. A communication path that is transitioning from active to idle state can be quickly determined by evaluating network data traffic within a predetermined time interval after the end of a data transmission. By strategically utilizing health probes at only a set predetermined time interval after a data transmission, a path break condition can be quickly determined without significant use of network bandwidth. Further, the path break condition can be determined unilaterally by one network appliance.

19 Claims, 10 Drawing Sheets

Related U.S. Application Data continuation of application No. 15/919,121, filed on Mar. 12, 2018, now Pat. No. 10,637,721.

(51) Int. Cl.
*H04L 43/10* (2022.01)
*H04L 43/12* (2022.01)
*H04L 43/04* (2022.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Somnath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 | 11/2004 | Smith et al. |
| 6,839,346 B1 | 1/2005 | Kametani |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,249,309 B2 | 7/2007 | Glaise et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 | 10/2008 | Bhardwaj |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 * | 2/2009 | Coverdill ............ H04L 43/0811 370/252 |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,768,939 B1 * | 8/2010 | Trivedi ................ H04L 43/10 370/252 |
| 7,793,193 B2 | 9/2010 | Koch et al. |

(56) References Cited

U.S. PATENT DOCUMENTS

| | | |
|---|---|---|
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,924,795 B2 | 4/2011 | Wan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 7,996,747 B2 | 8/2011 | Dell et al. |
| 8,046,667 B2 | 10/2011 | Boyce |
| 8,069,225 B2 | 11/2011 | McCanne et al. |
| 8,072,985 B2 | 12/2011 | Golan et al. |
| 8,090,027 B2 | 1/2012 | Schneider |
| 8,090,805 B1 | 1/2012 | Chawla et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |
| 8,565,118 B2 | 10/2013 | Shukla et al. |
| 8,570,869 B2 | 10/2013 | Ojala et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,091,172 B1 | 10/2018 | Hughes |
| 10,164,861 B2 | 12/2018 | Hughes et al. |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,637,721 B2 * | 4/2020 | Hughes ............... H04L 41/0686 |
| 10,719,588 B2 | 7/2020 | Hughes et al. |
| 10,771,370 B2 | 9/2020 | Hughes et al. |
| 10,771,394 B2 | 9/2020 | Hughes |
| 10,805,840 B2 | 10/2020 | Hughes et al. |
| 10,812,361 B2 | 10/2020 | Hughes et al. |
| 10,887,159 B2 * | 1/2021 | Hughes ............... H04L 41/0686 |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck et al. |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0048785 A1 | 3/2003 | Calvignac et al. |
| 2003/0067940 A1 | 4/2003 | Edholm |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |

(56) References Cited

U.S. PATENT DOCUMENTS

| | | |
|---|---|---|
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1* | 5/2004 | Wang .................. H04L 49/552 370/216 |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | DuRee |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Malamal et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara |
| 2006/0218390 A1 | 9/2006 | Loughran et al. |
| 2006/0227717 A1 | 10/2006 | Van et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0160200 A1 | 7/2007 | Ishikawa et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0291822 A1* | 11/2008 | Farkas .................. H04L 43/10 370/216 |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar et al. |
| 2009/0175172 A1 | 7/2009 | Prytz et al. |
| 2009/0182864 A1 | 7/2009 | Khan et al. |
| 2009/0204961 A1 | 8/2009 | Dehaan et al. |
| 2009/0234966 A1 | 9/2009 | Samuels et al. |
| 2009/0245114 A1 | 10/2009 | Jayanth |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |

(56) References Cited

U.S. PATENT DOCUMENTS

| | | |
|---|---|---|
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van et al. |
| 2011/0113472 A1 | 5/2011 | Fung et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0255418 A1* | 10/2011 | van Greunen ........ H04L 41/064 370/242 |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | Decusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le et al. |
| 2015/0127701 A1 | 5/2015 | Chu et al. |
| 2015/0143505 A1 | 5/2015 | Border et al. |
| 2015/0146544 A1* | 5/2015 | Liu .......................... H04L 1/08 370/248 |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1 | 4/2016 | Li |
| 2016/0142310 A1 | 5/2016 | Means |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0279029 A1 | 9/2020 | Hughes et al. |
| 2020/0358687 A1 | 11/2020 | Hughes et al. |

OTHER PUBLICATIONS

Final Written Decision, dated Dec. 30, 2014, Inter Partes Review Case No. IPR2013-00402, pp. 1-37.
Business Wire, "Silver Peak Systems Delivers Family of Appliances for Enterprise-Wide Centralization of Branch Office Infrastructure; Innovative Local Instance Networking Approach Overcomes Traditional Application Acceleration Pitfalls" (available at http://www.businesswire.com/news/home/20050919005450/en/Silver-Peak-Systems-Delivers-Family-Appliances-Enterprise-Wide#.UVzkPk7u-1 (last visited Aug. 8, 2014)), 4 pages.
Decision Granting Motion to Terminate, Inter Partes Review Case No. IPR2014-00245, Feb. 7, 2018, 4 pages.
Definition memory (n), Webster's Third New International Dictionary, Unabridged (1993), available at <http://lionreference.chadwyck.com> (Dictionaries/Webster's Dictionary).
Douglis, F. et al., "Application specific Delta-encoding via Resemblance Detection", Published in the 2003 USENIX Annual Technical Conference, pp. 1-14.
Final Written Decision, Dec. 30, 2014, Inter Partes Review Case No. IPR2013-00403, pp. 1-38.
Hong, B et al. "Duplicate data elimination in a SAN file system", In Proceedings of the 21st Symposium on Mass Storage Systems (MSS '04), Goddard, MD, Apr. 2004. IEEE, pp. 101-114.
IPsec Anti-Replay Window: Expanding and Disabling, Cisco IOS Security Configuration Guide. 2005-2006 Cisco Systems, Inc. Last updated: Sep. 12, 2006, 14 pages.

(56) References Cited

OTHER PUBLICATIONS

Knutsson, Bjorn et al., "Transparent Proxy Signalling", Journal of Communications and Networks, vol. 3, No. 2, Jun. 2001, pp. 164-174.
Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference, pp. 1-10.
Muthitacharoen, Athicha et al., "A Low-bandwidth Network File System," 2001, in Proc. of the 18th ACM Symposium on Operating Systems Principles, Banff, Canada, pp. 174-187.
Newton, "Newton's Telecom Dictionary", 17th Ed., 2001, pp. 38, 201, and 714.
Notice of Entry of Judgement Accompanied by Opinion, United States Court of Appeals for the Federal Circuit, Case: 15-2072, Oct. 24, 2017, 6 pages.
Riverbed, "Riverbed Awarded Patent on Core WDS Technology" (available at: http://www.riverbed.com/about/news-articles/pressreleases/riverbed-awarde-d-patent-on-core-wds-technology.html (last visited Aug. 8, 2014)), 2 pages.
Riverbed, "Riverbed Introduces Market-Leading WDS Solutions for Disaster Recovery and Business Application Acceleration" (available at http://www.riverbed.com/about/news-articles/pressreleases/riverbed-introd-uces-market-leading-wds-solutions-fordisaster-recovery-and-business-applic-ation-acceleration.html (last visited Aug. 8, 2014)), 4 pages.
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.
Shared Lan Cache Datasheet, 1996, <http://www.lancache.com/slcdata.htm>, 8 pages.
Silver Peak Systems, "The Benefits of Byte-level WAN Deduplication" (2008), pp. 1-4.
Singh et al. ; "Future of Internet Security—IPSEC"; 2005; pp. 1-8.
Spring et al., "A protocol-independent technique for eliminating redundant network traffic", ACM SIGCOMM Computer Communication Review, vol. 30, Issue 4 (Oct. 2000) pp. 87-95, Year of Publication: 2000.
Tseng, Josh, "When accelerating secure traffic is not secure" (available at http://www.riverbed.com/blogs/whenaccelerati.html?&isSearch=true&pageS-ize=3&page=2 (last visted Aug. 8, 2014)) 3 pages.
You, L. L. and Karamanolis, C. 2004. "Evaluation of efficient archival storage techniques", In Proceedings of the 21st IEEE Symposium on Mass Storage Systems and Technologies (MSST), pp. 1-6.
You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.

\* cited by examiner

METHODS AND SYSTEMS FOR DETECTING PATH BREAK CONDITIONS WHILE MINIMIZING NETWORK OVERHEAD

CROSS-REFERENCE TO RELATED APPLICATIONS

This application is a Continuation of, and claims the priority benefit of, U.S. patent application Ser. No. 16/811,014 filed on Mar. 6, 2020, which in turn is a Continuation of, and claims the priority benefit of, U.S. patent application Ser. No. 15/919,121 filed Mar. 12, 2018, now granted as U.S. Pat. No. 10,637,721 issued on Apr. 28, 2020. The disclosures of the above-referenced applications are hereby incorporated by reference in their entirety for all purposes.

TECHNICAL FIELD

This disclosure relates generally to the detection of a path break in a communication network.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Health packet probes are utilized to ping network components and check that they are operating as they should. Generally, health packets are transmitted at specific intervals. The receiving network component returns a confirmation of receipt of the health packets. If the receiving side fails to receive a few health packets in a row, it may determine that there is a problem with the communication network link. Alternatively, or in addition, if the transmitting side fails to receive a few health packet acknowledgements in a row, it may determine that there is a problem with the communication network link. In addition, the time between transmission of health packets may be increased if the link is idle, or decreased if there is a suspicion that a problem may exist with the link, to conserve network bandwidth.

Traditionally, when a problem is suspected on a network link, more health packets are transmitted. The time in between a suspicion and a confirmation of a break in a network link can be several seconds, or longer. In the interim, the link continues to be used. If the link is confirmed as nonoperational, then all the data transmitted over it while waiting for confirmation of nonoperational status, is lost. Thus, a mechanism is needed to detect a break in a network link quickly.

Further, in an enterprise comprising many network components, sending health packets between every network device continuously can significantly increase the network traffic and congestion. Thus, a mechanism is needed to detect a break in a network link without continuously sending many health packets and unnecessarily increasing network overhead.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary embodiments, a method for quickly determining a break condition in a communication path by a receiving network appliance of a plurality of network appliances, comprises: receiving at a receiving network appliance, a first plurality of data packets transmitted by a transmitting network appliance over a communication path; determining that a first predetermined time interval has elapsed since the first plurality of data packets was received by the receiving network appliance over the communication path, wherein no data packets or health probe packets are received within the first predetermined time interval; after expiration of the first predetermined time interval, expecting receipt of either a data packet or a health probe packet during a second predetermined time interval; determining that a second predetermined time interval has elapsed since the first plurality of data packets was received by the receiving network appliance over the communication path, wherein no data packets or health probe packets are received within the second predetermined time interval; and sending a message to the transmitting network appliance that there is likely a break condition in the communication path.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to the fast detection of path break conditions while minimizing network overhead.

I. System Setup

Figure 1:
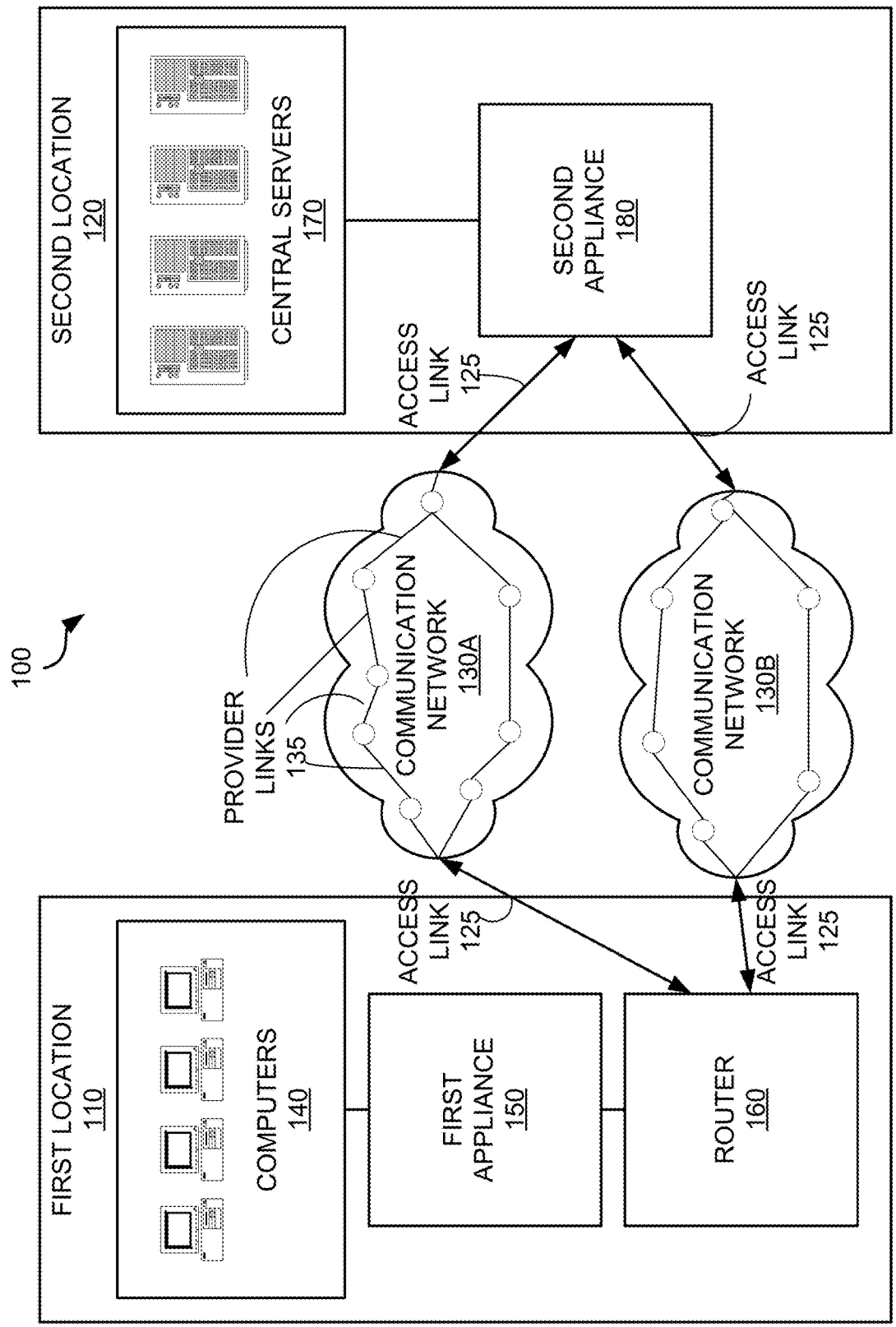
FIG. 1 depicts an exemplary environment, within which the present disclosure can be implemented.

FIG. 1 illustrates an exemplary environment 100, within which the present disclosure can be implemented. The exemplary environment 100 includes a first location 110, a second location 120 (also sometimes referred to as a data center), and two communication networks 130A and 130B. While two communication networks are depicted in exemplary environment 100, there can be any number of communication networks, including just one, or three or more.

In exemplary embodiments, first location 110 may be a branch location of an enterprise, a central location, or a data center. In the exemplary environment 100 of FIG. 1, first location 110 includes computers 140, a first appliance 150, and a router 160. In the first location 110, the computers 140 are linked to the first appliance 150. The first appliance 150 is linked to the router 160, which is coupled to the communication networks 130A and 130B. While only one appliance is depicted in first location 110, there can be multiple appliances, physical and/or virtual, at first location 110. Similarly, while only one router 160 is depicted in exemplary environment 100, there can be multiple routers, switches, or other equipment (physical or virtual) at first location 110. Additionally, in some embodiments, first appliance 150 may be in communication with the one or more communication networks directly, instead of through router 160.

In various embodiments, second location 120 may be a branch location of an enterprise, a central location, or a data center. The second location 120 in exemplary environment 100 of FIG. 1 includes central servers 170 and a second appliance 180. While the term "server" is used herein, any type of computing device may be used in second location 120. In the second location 120, the central servers 170 are linked to the second appliance 180. The second appliance 180 is coupled directly to the communication networks 130A and 130B. While only one appliance is depicted in second location 120, there can be multiple appliances, physical and/or virtual, at second location 120. Additionally, in some embodiments, second appliance 180 may be in communication with the one or more communication networks through a router, switch, or other physical or virtual equipment, instead of directly.

The principles discussed herein are equally applicable to multiple branch locations (not shown) and to multiple central locations (not shown). For example, the environment 100 may include multiple branch locations and/or multiple central locations coupled to one or more communication networks. Branch location/branch location communication, central location/central location communication, central location/cloud appliance communication, as well as multi-appliance and/or multi-node communication and bi-directional communication are further within the scope of the disclosure. However, for the sake of simplicity, the disclosure illustrates the environment 100 as having a single branch location at first location 110 and a single central location as second location 120.

The communication networks 130A and 130B comprise hardware and/or software elements that enable the exchange of information (e.g., voice, video, and data) between the first location 110 and the second location 120. Some examples of the communication network 130 are a private wide-area network (WAN), and the public Internet. Typically, connections from the first location 110 to the communication networks (e.g., from the router 160 and second appliance 180) are T1 lines (1.544 Mbps), or broadband connections such as digital subscriber lines (DSL) and cable modems. Other examples are MPLS lines, T3 lines (43.232 Mbps), OC3 (155 Mbps), and OC48 (2.5 Gbps), fiber optic cables, or LTE (Long Term Evolution) wireless access connection. One or more of the communication networks 130A and 130B can also be a cloud network or virtual network.

The router 160 and second appliance 180 are connected to the communication networks 130A and 130B via access links 125, sometimes also referred to herein as network access links. The communication networks consist of routers, switches, and other internal components that make up provider links 135, that are managed by the network service providers such as an internet service provider. Access links 125 and provider links 135 can be combined to make various network paths along which data travels. The exemplary embodiment of FIG. 1 depicts two paths through each communication network, showing a total of four network paths for data to be exchanged between the first appliance 150 and second appliance 180. As understood by persons of ordinary skill in the art, there can be any number of network paths across one or more communication networks.

The first appliance 150 and second appliance 180 comprise hardware and/or software elements configured to receive data and optionally perform any type of processing, including but not limited to, WAN optimization techniques to the data, before transmitting to another appliance. The operations of the second appliance 180 may be similar to the operations of the first appliance 150.

As illustrated, the first appliance 150 is configured in-line (or serially) between the computers 140 and the router 160. The first appliance 150 and the second appliance 180 transparently intercept network traffic between the computers 140 and the central servers 170. For example, the second appliance 180 transparently intercepts data sent from the central servers 170 and addressed to the computers 140. The computers 140 and the central servers 170 advantageously require no additional configuration because the first appliance 150 and the second appliance 180 operate transparently.

Alternatively, the first appliance 150 and the second appliance 180 are configured as an additional router or gateway. As a router, for example, the first appliance 150 appears to the computers 140 as an extra hop before the router 160. In some embodiments, the first appliance 150 and the second appliance 180 provide redundant routing or peer routing with the router 160. Additionally, in the bridge and router configurations, the first appliance 150 and the second appliance 180 provide failure mechanisms, such as, fail-to-open (e.g., no data access) or fail-to-wire (e.g., a direct connection to the router 160). If an appliance has multiple interfaces, it can be transparent on some interfaces, and act like a router/bridge on others. Alternatively, the appliance can be transparent on all interfaces, or appear as a router/bridge on all interfaces.

In some embodiments, the environment 100 includes one or more secure tunnels between the first appliance 150 and the second appliance 180. The secure tunnel may be utilized with encryption (e.g., IPsec), access control lists (ACLs), compression (such as header and payload compression), fragmentation/coalescing optimizations and/or error detection and correction provided by an appliance.

Figure 2:
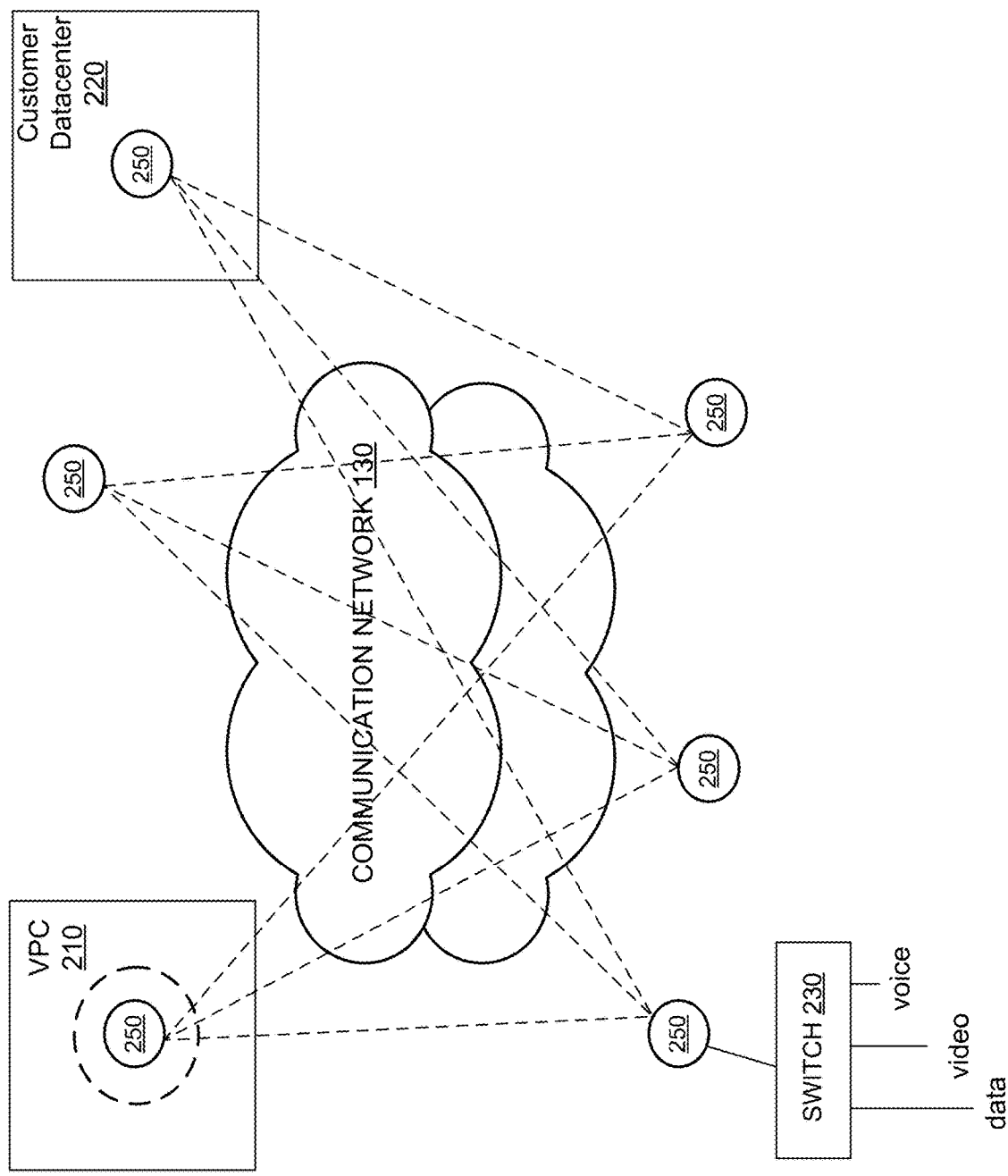
FIG. 2 depicts an exemplary network for connecting multiple appliances.

An exemplary network for connecting multiple appliances 250 is depicted in FIG. 2. Each appliance 250 can be in communication with other appliances 250, whether they are in a first location 110, second location 120, private cloud network, customer datacenter, or any other location. In the exemplary embodiment of FIG. 2, a network is displayed where appliances are in communication with each other. As understood by persons of ordinary skill in the art, any type of network topology may be used.

Each appliance can be physical or virtual. In the exemplary embodiment of FIG. 2, a virtual appliance is depicted as being in its own virtual private cloud (VPC) 210, managed by a cloud service provider, such as Amazon Web Services, or others. Another appliance in customer datacenter 220 can be physical or virtual.

As discussed herein, the communication network 130 can comprise multiple provider links, made up of routers and switches, connecting networked devices in different locations. These provider links, which together form various paths, are part of one or more core networks, sometimes referred to as an underlay network. In addition to these paths, there can also be tunnels connecting two networked devices. A virtual network, sometimes called an overlay network, can be used to transmit data across the underlay network, regardless of which Service Provider manages the routes or provider links. Data from connected devices can travel over this overlay network, which can consist of any number of tunnels or paths between each location.

In an exemplary embodiment, data from computers 140 at first location 110 may include voice, video, and data. This information is sent through switch 230, and then transmitted by an appliance 250 over the communication network 130 to other connected appliances 250. In some embodiments, voice, video, and data may be received and transmitted on separate LAN or vLAN interfaces, and the appliance 250 can distinguish the traffic based on the LAN/vLAN interface at which the data was received on.

Figure 3:
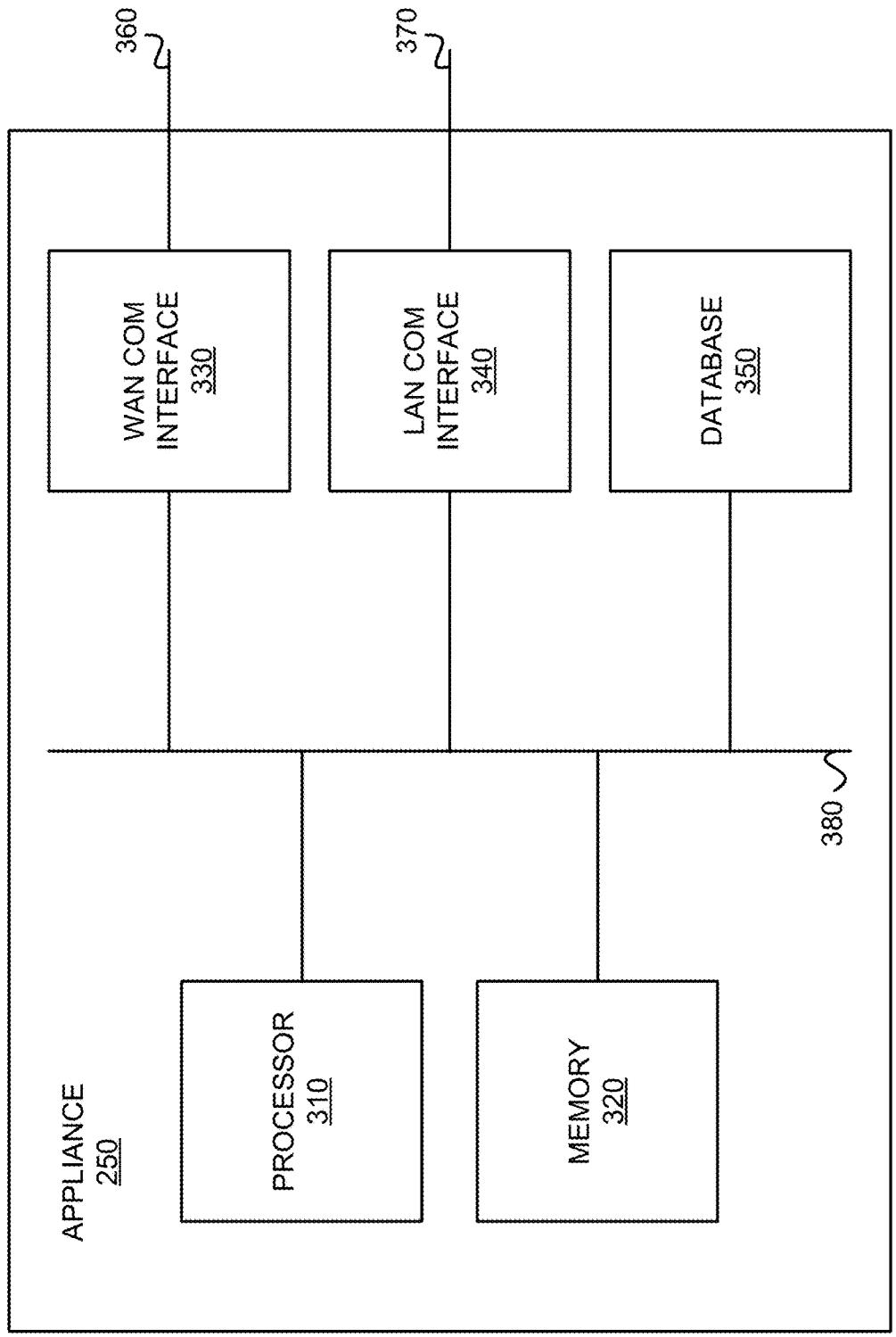
FIG. 3 depicts a block diagram of an exemplary network appliance.

FIG. 3 illustrates a block diagram of an appliance 250, in an exemplary implementation of the invention. The appliance 250 includes a processor 310, a memory 320, a WAN communication interface 330, a LAN communication interface 340, and a database 350. A system bus 380 links the processor 310, the memory 320, the WAN communication interface 330, the LAN communication interface 340, and the database 350. When deployed in a branch location, line 360 links the WAN communication interface 330 to the router 160 (in FIG. 1), and line 370 links the LAN communication interface 340 to the computers 140 in FIG. 1.

The database 350 comprises hardware and/or software elements configured to store data in an organized format to allow the processor 310 to create, modify, and retrieve the data. The hardware and/or software elements of the database 350 may include storage devices, such as RAM, hard drives, optical drives, flash memory, and magnetic tape.

In some embodiments, some appliances comprise identical hardware and/or software elements. Alternatively, in other embodiments, some appliances, such as a second appliance, may include hardware and/or software elements providing additional processing, communication, and storage capacity.

Figure 4:
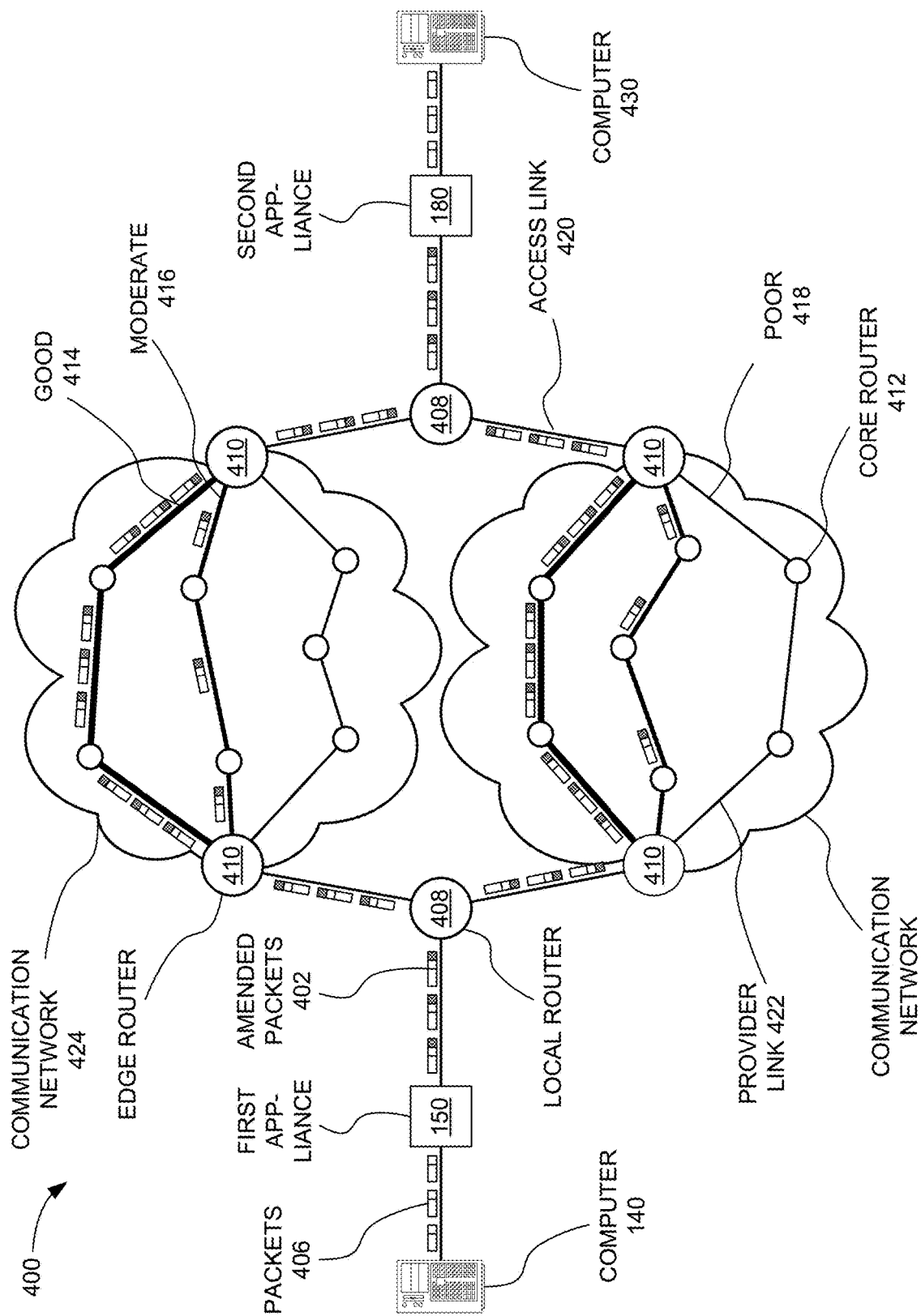
FIG. 4 depicts an exemplary implementation of data packet transfer over a network using quality of service using multiple flows.

FIG. 4 illustrates an exemplary implementation of data packet transfer over a network using quality of service using multiple flows. An environment 400, as depicted in FIG. 4, may include certain similar elements as the environment 100, such as the computers 140 and 430. The environment may also include a communication network 424, a communication network 404, as well as the various routers (e.g., the local routers 408, the edge routers 410, and the core routers 412). The communication networks 404 and 424 are composed of provider links, such as provider link 422, similar to provider links 135 of FIG. 1. Access link 420 may be used by a networked device to access the communication network 404. The environment 400 also includes a first appliance 150, positioned between the computer 140 and one of the local routers 408. The second appliance 180 is positioned between the computer 430 and another local router 408.

In some embodiments, the first appliance 150 may amend the packet 406 received from the computer 140 via the inter-computer flows to affect which inter-device flow the packet is directed to, this resulting in an amended packet 402. According to one embodiment, the packet 406 is amended such that an additional header portion is added to the packet 406, while according to another embodiment, the packet 406 is amended such that certain information in the header portion is altered or replaced (sometimes called encapsulation or tunneling to create tunnel packets). The amended packet 402 may be restored to the packet 406 upon receipt by the second appliance 180. After which, the packet 406 may be delivered to the computer 430 on the inter-computer flow from which it originated. Again, it is noted that the first appliance 150 may be equivalent to, and interchangeable with, the second appliance 180 in that any task or procedure carried out by the first appliance 150 may be carried out by the second appliance 180, and vice versa.

The data paths of environment 400 may be of varying quality, such as a good flow 414, a moderate flow 416, or a poor flow 418. Quality of a given path may be determined by certain metrics. As mentioned herein, the metrics may include latency, re-ordering, jitter, and/or loss of packets, and may be referred to as a latency metric, a re-ordering metric, and a loss metric, respectively.

The latency metric may simply be described as a time required for the packet to reach a destination. In some cases, the latency metric may be related to round-trip time (RTT). Many different communication network delays may comprise the latency metric. For example, a processing delay is time taken by various routers (e.g., the local router 408, the edge router 410, and the core router 412) to process the header of the packet. A queuing delay may be time that the packet spends in routing queues. Time required to push the packet into a physical link connecting the various routers may be referred to as a transmission delay. Lastly, a propagation delay is time required for a signal comprising the packet to propagate through a medium (e.g., a wire, a cable, or air) used to transmit the packet.

The re-ordering metric determines a level of re-ordering of the packets that is required upon arrival of the packets at the destination, in exemplary embodiments. To illustrate, when a plurality of related packets is transmitted across the communication network(s), different packets may be directed to different paths. This may be due to packets from a single flow being directed to more than one path, for example. The plurality of related packets may resultantly arrive at the destination in a different order than as sent. Thus, the plurality of related packets may require re-ordering. The re-ordering of packets may have a dramatic impact, for example, on VoIP and video data streams, and TCP/IP data streams.

The loss metric quantifies packet loss, which occurs when one or more packets being transmitted across the communication network fail to reach the destination. Packet loss may be caused by any number of one or more factors, such as signal degradation, oversaturation of the communication network, corrupted packets being rejected in-transit, faulty communication networking hardware, and maligned system drivers or communication network applications. The loss metric may also consider bit error and/or spurious packets. Although the latency metric, the re-ordering metric, and the loss metric are described herein, other metrics may comprise the flow metrics and still fall within the scope of the present invention.

The paths or tunnels in environment 400 may be categorized based on various flow metrics. These flow metrics may be related to, for example, latency, re-ordering, jitter, and/or loss of packets, among other metrics. The packets may be directed to tunnels having preferable metrics without any specific knowledge or concern of the communication network, protocols, or computers thereof.

Classifying the flows based on the flow metrics may aid the appliances 150 and 180 in determining which packets should be directed to which inter-device flows. For example, the inter-device flows may be grouped into three classifications. A first classification may be associated with inter-device flows having preferable flow metrics, which exhibit excellent performance in transferring the packets. The first classification may be reserved for packets having highest priorities. A second classification may be ascribed to inter-device flows having slightly less preferable flow metrics, relative to the first classification, but nevertheless acceptable. Packets that must be transferred, but that are less essential, may be directed to the inter-device flows having the second classification. Poorly performing inter-device flows, having less than desirable flow metrics, may be used only sparingly. However, in one example, at least some packets may be directed to each inter-device flow to determine the flow metrics.

As shown in FIG. 4, the amended packets 402 may advantageously be more heavily distributed to the inter-device flows having preferable flow metrics (e.g., the good flow 414). The moderate flow 416 may transfer less of the amended packets 402, while the poor flow 418 may transfer even fewer.

Figure 5:
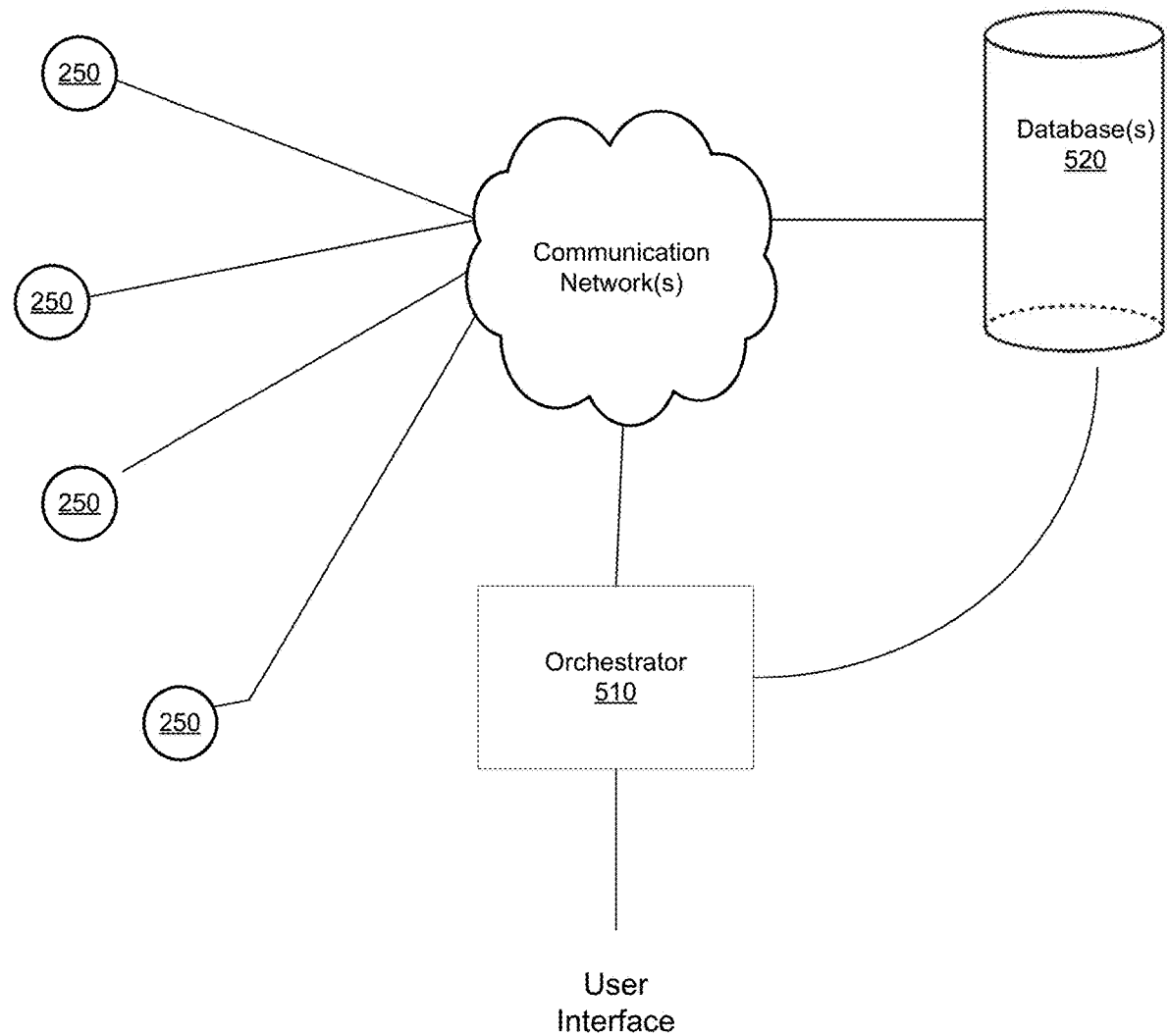
FIG. 5 depicts an exemplary environment of a plurality of network appliances in communication with an orchestrator device.

In various embodiments, a plurality of network appliances 250 can be in communication with an orchestrator device, as depicted in FIG. 5. Though not depicted, the network appliances can also be in communication with one another via any network topology. The orchestrator 510 can be hardware and/or software, and be in communication with each of the networked devices, such as the appliances 250, as well as in communication with the database(s) 520.

In exemplary embodiments, the orchestrator may maintain information regarding the configuration of each appliance at each physical location. In this way, the orchestrator can create, manage, and deploy business objectives for network traffic throughout the network of connected devices. For example, if a higher priority is designated for voice traffic at each location, the orchestrator can automatically configure the corresponding network interfaces at each location accordingly.

By having knowledge of the configuration of each appliance in the network, the orchestrator 510 can also create and manage all of the bonded tunnels in the enterprise network, each bonded tunnel carrying a particular type of network traffic between each source-destination appliance pair. The orchestrator 510 can automatically configure the enterprise network by determining which overlay and underlay tunnels need to be set up, and automatically creating them based on the network nodes and overlays.

II. Data Transmission

There can be multiple provider links, made up of routers and switches, connecting devices in different locations, as explained herein and known to persons of ordinary skill in the art. Physical provider links, which make up paths, are part of one or more core networks, sometimes referred to as an underlay network. These provider links can be managed by different service providers, such as Internet Service Providers.

For example, within an MPLS network, there can be multiple provider links within the MPLS communication network that are managed by a MPLS service provider. There can also be an access link connecting a device outside of the communication network to the MPLS network. Other access links can connect a device to other communication networks, such as cable, DSL, or wireless networks such as LTE.

There may be tunnels, carrying packets such as IPsec packets, over each of these provider links from a source device to a destination device. In embodiments of the present invention, separate bonded tunnels can be used for each type of data traffic, such that each type of data traffic can remain separate across the network and arrive as a separate flow at the destination site. In various embodiments there are at least three layers of tunnels—underlay tunnels in a core network, overlay tunnels, and bonded tunnels. Additional description of bonded tunnels can be found in corresponding U.S. Pat. No. 9,717,021 issued on Jul. 25, 2017 entitled "Virtual Network Overlay", the disclosure of which is hereby incorporated by reference.

The underlay tunnels to be utilized are qualified based on tunnel metrics, bonding policy, business intent, and/or quality of service desired. That is, a determination is made as to which underlay tunnel(s) are acceptable based on the metrics and quality of service desired. Thus, each overlay can use different underlay tunnels, based on network performance determined from measured metrics. In various embodiments, an overlay network can send data through multiple underlay tunnels at the same time, in a packet by packet manner, load balancing over each of the underlay tunnels. In other embodiments, multiple underlay tunnels may be used on a flow-by-flow basis (i.e., packets of a certain flow all travel over the same underlay tunnel). Further, sticky flows may be used such that every packet on a given flow gets transmitted across the same underlay tunnel until network conditions or loading trigger a reassignment.

In various embodiments, data packets can be transmitted across all, or any portion of, qualified underlay tunnels. From each underlay tunnel's endpoint, the traffic is sent to the appropriate network through a network service provider. In this way, the system allows for the selection of a network to be utilized for the data packets associated with a particular type of network traffic and profile based on business intent and network performance, without controlling the routing through the physical network provider links of each individual network. Underlay tunnels may carry traffic for different overlay tunnels, i.e. traffic for voice overlay and traffic for data overlay.

III. Detection of Path Break

Figure 6A:
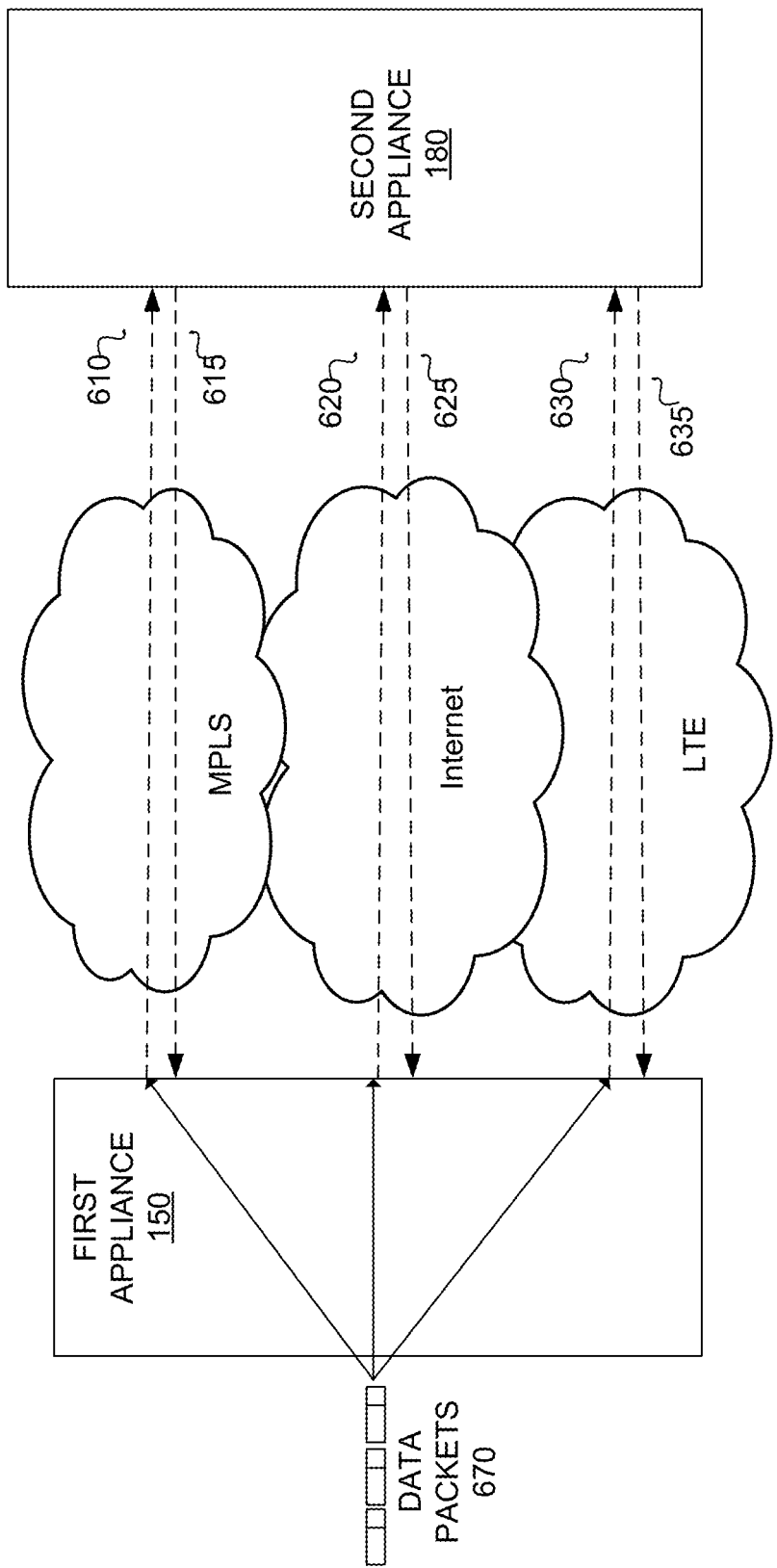
FIG. 6A depicts an exemplary environment in which embodiments of the present disclosure may be implemented.

FIG. 6A depicts an exemplary environment in which embodiments of the present disclosure may be implemented. In the exemplary embodiment, data packets 670 are queued at first appliance 150 for transmission across a communication network to second appliance 180. There may be one or more available communication networks available for transmitting data, for example an MPLS network, Internet, and LTE network. As would be understood by persons of ordinary skill in the art, there can be fewer or additional communication networks available for transmitting data between first appliance 150 and second appliance 180, than those depicted in the exemplary figure.

Exemplary FIG. 6A also depicts one communication path in each direction through each of the communication networks, that is communication paths 610-635. However, this is merely for simplicity and there can be many communication paths through each communication network.

In some embodiments, first appliance 150 transmits data packets over a communication path to second appliance 180. While second appliance 180 receives the data packets, second appliance 180 knows that the communication path is operational. There may be delay or loss over the path, but it is operational since data was received. Thus, there is no need for a health packet to be transmitted over the path simply to test whether the path is operational for an active path, i.e. a path that is actively transmitting data.

In other embodiments, a communication link between first appliance 150 and second appliance 180 may be idle after a data transmission. That is, there may be no data to transmit (the transmission has completed), or the data traffic is currently being handled by other paths, or there has been a break in the path. The second appliance 180 that had been receiving data packets previously over a path that is now idle will need to know whether the path has become idle for a legitimate reason (such as the transmission being complete), or the path has become idle unexpectedly due to a path break, or there is merely a delay in data transmission. To test whether there is a path break or not, a burst of health probe packets may be transmitted from the first appliance 150 to the second appliance 180. Receipt of all the health probe packets indicates that the path is operational. Receipt of some of the health probe packets indicates that there may be some problem (such as delay) with a path, but it is operational. Receipt of none of the health probe packets in the burst indicates that there is a break somewhere along the path.

Figure 6B:
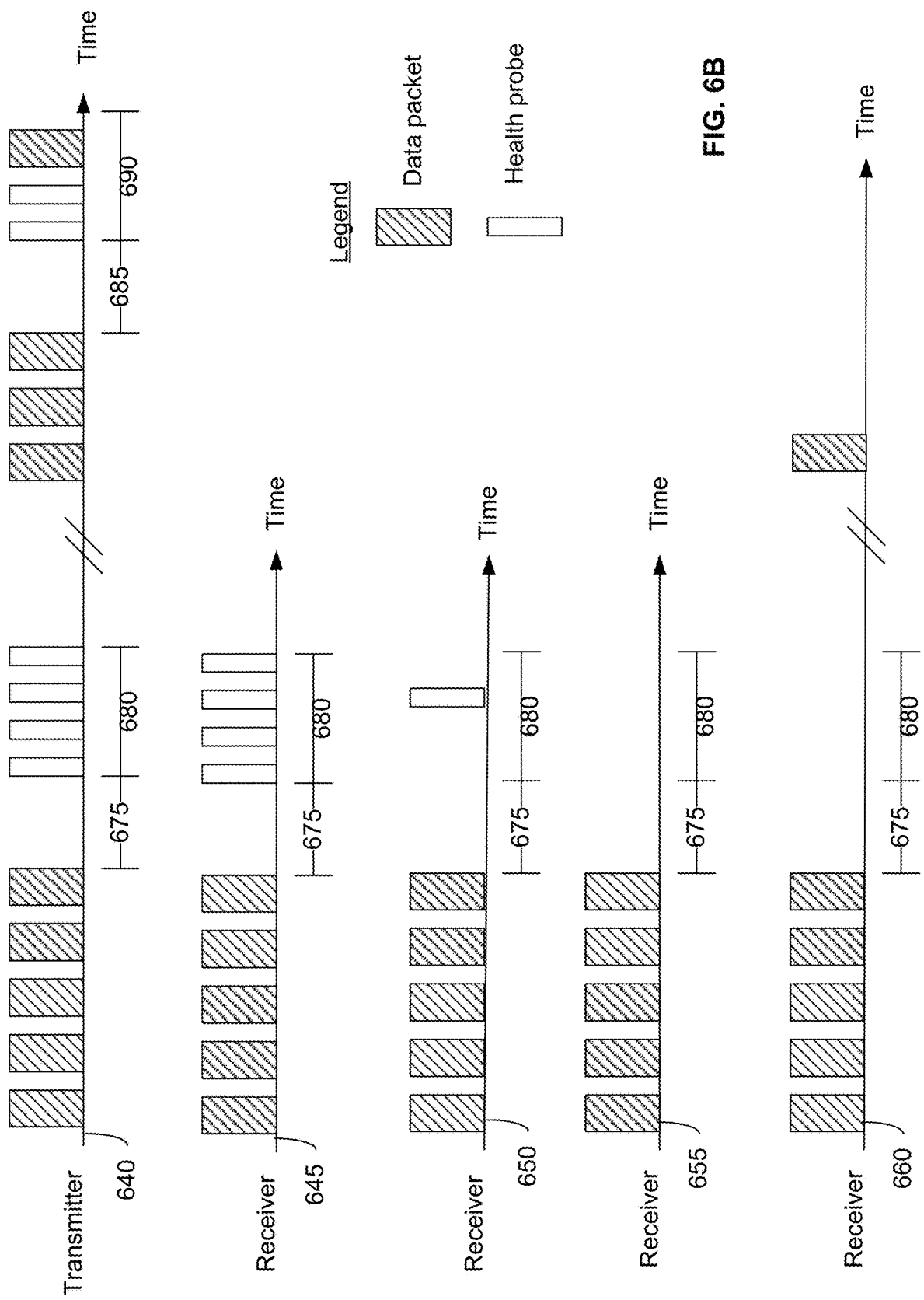
FIG. 6B depicts exemplary timelines in which embodiments of the present disclosure may be implemented.

Exemplary FIG. 6B depicts various embodiments of timelines that may occur within the exemplary environment of FIG. 6A. As discussed herein, the transmitter can be either of first appliance 150 or second appliance 180. Similarly, the receiver can be either of first appliance 150 or second appliance 180.

Exemplary timeline 640 shows that the transmitter transmits data packets to a receiving side, and then stops. The transmission can be over any type of communication path, such as any one or more of paths 610-635 of FIG. 6A. After ceasing transmission of data packets, a first period of time elapses since the end of data transmission, depicted as time period 675. The receiving appliance does not know whether the data transmission has ceased because the flow has ended, or if the data transmission has ceased because there is a delay or break in the communication path. The transmitter may wait a first period of time, depicted as time period 675, and then transmit a series of health probes over a second time period, depicted as time period 680 in FIG. 6B. In exemplary embodiments, the burst of health probes in time period 680 may be transmitted only one time after a data transmission ends, and not transmitted periodically while the path is idle. In this way a path break condition can be quickly detected while minimizing the amount of network bandwidth overhead dedicated to testing the health of network appliances.

While four health probes are depicted in timeline 640 of FIG. 6B for simplicity, there can be any number of health probes transmitted at any interval. In exemplary embodiments, there can be 10-50 health probes transmitted 10 milliseconds apart. Time periods 675 and 680 can be any predetermined length of time customizable by a network administrator, or dynamically adjusted according to network conditions. For example, time period 675 may be 250 milliseconds, and time period 680 may be 300 milliseconds if there are 30 health probes sent 10 milliseconds apart. In preferred embodiments, time period 675 is between 100 milliseconds to 1 second. Further, in preferred embodiments, there are 10-50 health probes transmitted during time period 680, spaced 1-100 milliseconds apart.

Timeline 645 depicts one exemplary embodiment from the receiver side. The receiver receives the series of data packets sent by the transmitter and then suddenly stops receiving data. A predetermined first period of time elapses, shown as time period 675, and then a series of health probes are received during time period 680. Since all health probes transmitted were received within time period 680, the receiver can conclude that the communication path is operational, and data transmission has likely ceased simply because the transmission is completed.

Timeline 650 depicts another exemplary embodiment from the receiver side. The receiver receives the series of data packets sent by the transmitter and then suddenly stops receiving data. A predetermined first period of time elapses, shown as time period 675, and then only one health probe is received during time period 680. Since the transmitter and receiver are in communication with one another, the receiver knows that a certain number of health probes are expected to be received during time period 680. When the full expected amount of health probes are not received by the receiver, this indicates to the receiver that the communication path may have some delay or loss, but the path is operational since at least one health probe was received within time period 680. While only one health packet is depicted for simplicity in timeline 650 of FIG. 6B, there can be any number of health probes received during time period 680 less than the expected number of health probes.

Since the path is operational, but is not performing optimally, the receiver may be unable to conclude definitively whether the data transmission has ceased due to a problem with the path (such as loss or delay), or the data transmission has ceased due to the transmission being completed. In various embodiments, subsequent health probes may be sent to determine the status conclusively.

Timeline 655 depicts a third exemplary embodiment from the receiver side. The receiver receives the series of data packets sent by the transmitter and then suddenly stops receiving data. The predetermined first period of time elapses in time period 675. The receiver expects to receive a burst of health probes during time period 680, however, no health probes are received during time period 680. This indicates to the receiver that the communication path is nonoperational since no health probes were received within time period 680, as expected. The receiver will not know where the problem lies specifically—that is, with the network access link connecting the receiving appliance to the communication network, or with one or more provider links within the communication network itself. However, the receiving appliance can unilaterally determine that there is a suspected break somewhere along the chain of communication from the transmitting appliance to the receiving appliance. The receiving appliance may then notify the transmitting appliance that there is a break somewhere along the network path.

In this way, the receiving appliance can unilaterally determine a path break condition. Unlike a traditional health probe that requires a transmission and an acknowledgment, the receiving appliance detects the path break condition simply by failing to receive any expected health probes within a certain time period after data is received over the path.

While it is possible that the data transmission was in fact completed, the receiving appliance knows that a burst of health probes is expected within a certain time interval after a data transmission. Failure to receive any of the health probes within that time interval (time period 680 in FIG. 6B), indicates to the receiver that there is likely a path break.

Upon notification that there is a suspected break along the path, the transmitting appliance may make the path ineligible and select a different path for further data transmissions, either in the same communication network, or in a different communication network. A different network path can be chosen, in accordance with network path metrics and classifications discussed above. Alternatively, the transmitting appliance may transmit a series of fast health probe packets to verify whether there is a break along the path, or merely a delay or loss of certain packets. If none of the series of fast health probe packets are acknowledged as received, then the transmitting appliance may determine that there is indeed a break along the path.

In other embodiments, timeline 640 depicts that after a period of time, which may be as short as a few seconds, or as long as a few days, the transmitter begins data transmission again. Once the second data transmission ceases, the transmitter waits the predetermined first period of time 685 (which may be the same amount of time as time period 675), and then begins transmitting health probes during time period 690 (which may be the same amount of time as time period 680). While transmitting health probes during time period 690, a new data flow may begin and thus health probes cease to be transmitted during time period 690 and the data transmission begins. As long as the receiver receives anything during time period 690 (either the health probes or the data packets for the new flow), the receiver knows that the communication path is operational.

Timeline 660 depicts an exemplary embodiment from the receiver side. The receiver receives the series of data packets sent by the transmitter and does not receive any of the expected health probes during time period 680. After some time elapses, which can be as short as 1 second or as long as a few days, the receiver suddenly receives a data packet again. This indicates to the receiver that the path has become operational again.

The time periods 675 and 680 may be variable depending on any number of factors, such as the type of communication path or path history. That is, a different amount of time may be designated for an MPLS, Internet, or LTE paths, for each of time periods 675 and 680. This may be advantageous when one or more of the communication networks are more heavily utilized than other communication networks and thus path break needs to be determined quickly. Further, certain communication networks are costlier to utilizer than others, so a different schedule of health probe packets may be warranted based on the costs.

By utilizing health probes within this predetermined period of time after data transmission, it can be quickly determined whether a pause in data transmission is due to a path break condition, or simply a communication path transitioning from an active to an idle state. Thus, the amount of network traffic dedicated to health probes can be reduced in comparison to conventional systems. Further, by limiting the frequency of health probes to only a predetermined time period, a detection in the break of a network path can be swiftly determined without consuming significant amounts of network bandwidth for this purpose. If data is being transmitted over a network path that has become nonoperational, then the amount of time needed to detect a break in the network path becomes critical since the data is being lost in transit.

In some embodiments, while transmitting data, the system also continually monitors the network health metrics across the various access links, provider links and tunnels. In an exemplary embodiment, it may be determined that the latency of the MPLS access link has increased to 150 ms and the loss rate has increased to 0.5%. Meanwhile, the Internet access link metrics remain the same at 100 ms latency and 0.3% loss. Thus, the Internet link has now become the better access link for data transmission, and may automatically be re-designated as the primary access link while the MPLS link is re-designated as the secondary access link. Therefore, data packets are now transmitted from the first appliance to the second appliance over the Internet access link. Thus, data transmission can change to a different communication path based on network performance metrics, in addition to information from health probe packets utilized for measuring network performance. In this way, the system may also continually monitor the network health metrics and transmit data over the best quality access link as a primary access link, regardless of whether that primary link is MPLS, Internet, or some other type of network, thus allowing for dynamic switching of access links for data transmission. Also, by modulating the health probe packets transmitted over all these communication networks, a multitude of paths and tunnels are available for use for transmitting data without increasing network traffic exponentially.

Figure 7:
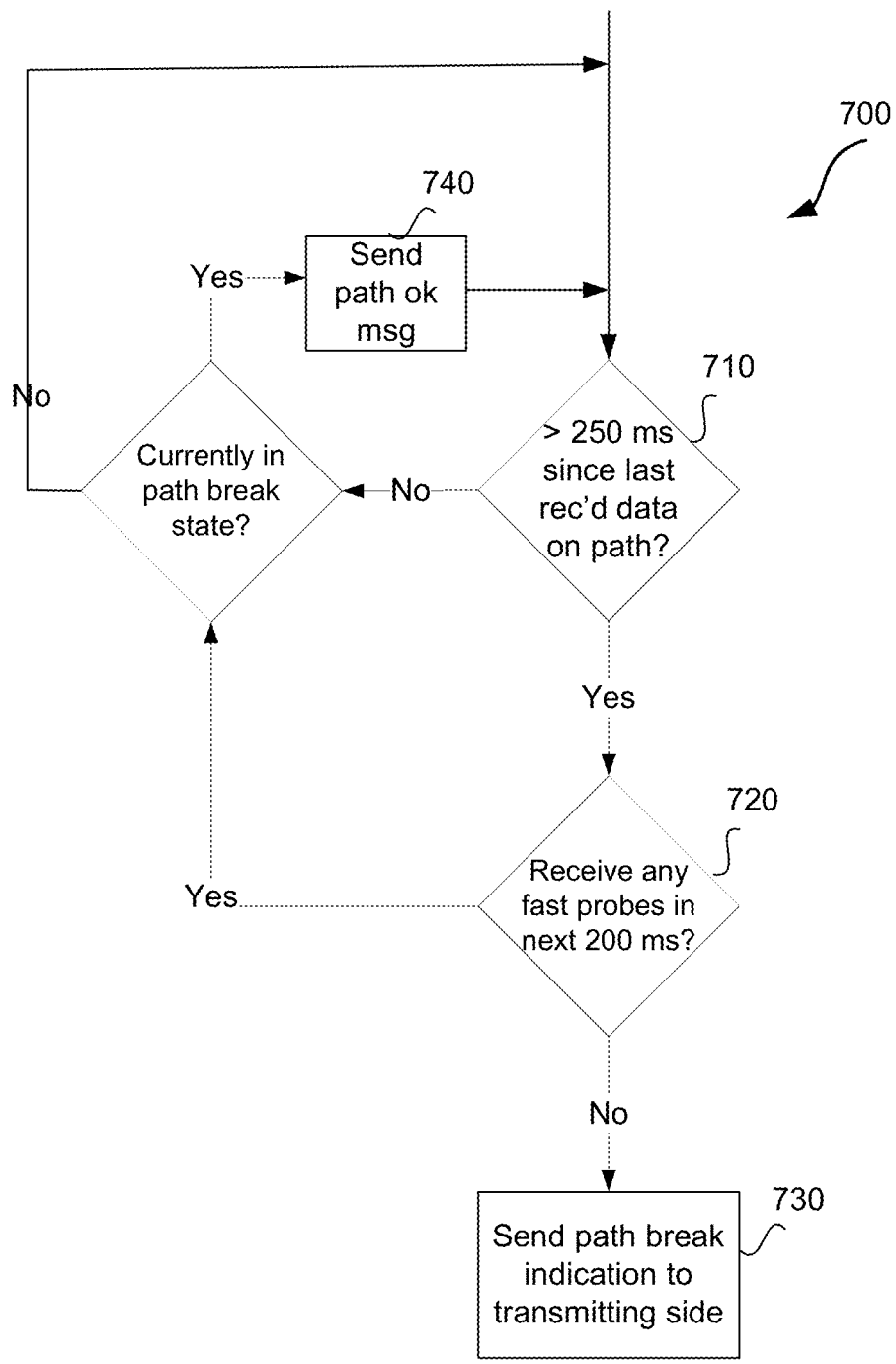
FIG. 7 depicts an exemplary flowchart for detecting a path break by a receiving network appliance.

With the present disclosure, path break conditions can be detected unilaterally by a receiving network appliance. FIG. 7 depicts an exemplary flowchart 700 for detecting a path break by a receiving network appliance, such as second appliance 180 in FIG. 6A. In step 710, the receiving network appliance determines if a first time period has elapsed since the last data was receiver over the particular network path. In exemplary FIG. 7, the first time period is 250 milliseconds. As discussed here, any time interval greater than or less than 250 milliseconds can be used. If more than 250 milliseconds have elapsed since the last data was received over the particular network path, then the receiving network appliance determines if any fast health probes are received during a second time period. In exemplary FIG. 7, the second time period is 200 milliseconds in step 720. However, any time interval greater or less than 200 milliseconds can be used in various embodiments.

If no fast health probes are received in the second time period of 200 milliseconds as expected, then a likely path break is unilaterally determined by the receiving appliance. The receiving appliance may send a path break indication to the transmitting appliance in step 730, such as a fail message.

In further embodiments, the receiving network appliance can determine that a path that was previously determined to be in a path break state has become operational again. If the receiving network appliance receives a data packet within the first time interval, or receives a health probe during the second time interval, and the path had previously been determined to be in a path break state, then the receiving network appliance may determine that the path is operational again and send a path ok message in step 740 to the transmitting network appliance. This would make the path eligible for use for data transmission again. If the path was not previously determined to be in a path break state, then it is not necessary to send a path ok message to the transmitting network appliance. The path fail message in 730 and the path ok message can be conveyed to the transmitting side using a reliable protocol using retransmission and using multiple paths, if there is more than one path available. In some embodiments these messages may be combined with other path information travelling back from the receiver to the transmitter to create a larger aggregate message.

With this method, a determination can be made as to whether a breakdown in communications is a one-way break or a two-way break. That is, a determination can be made as to whether the problem lies with the transmission side or the receiving side. If the receiving appliance is expecting to receive certain data packets or health probes, and does not receive them within the expected time intervals, then it can determine that the problem lies with the transmission side.

In other embodiments, the transmission side may determine that a path break condition is due to a problem with the receiving side if expected acknowledgement(s) to data packets or health probes are not received within certain expected time intervals. Thus, a determination can be made as to which side is broken, and not just that there is a breakdown in communication between the two appliances. In other embodiments, a path ok message serves as an acknowledgment instead of a traditional ACK packet.

Figure 8:
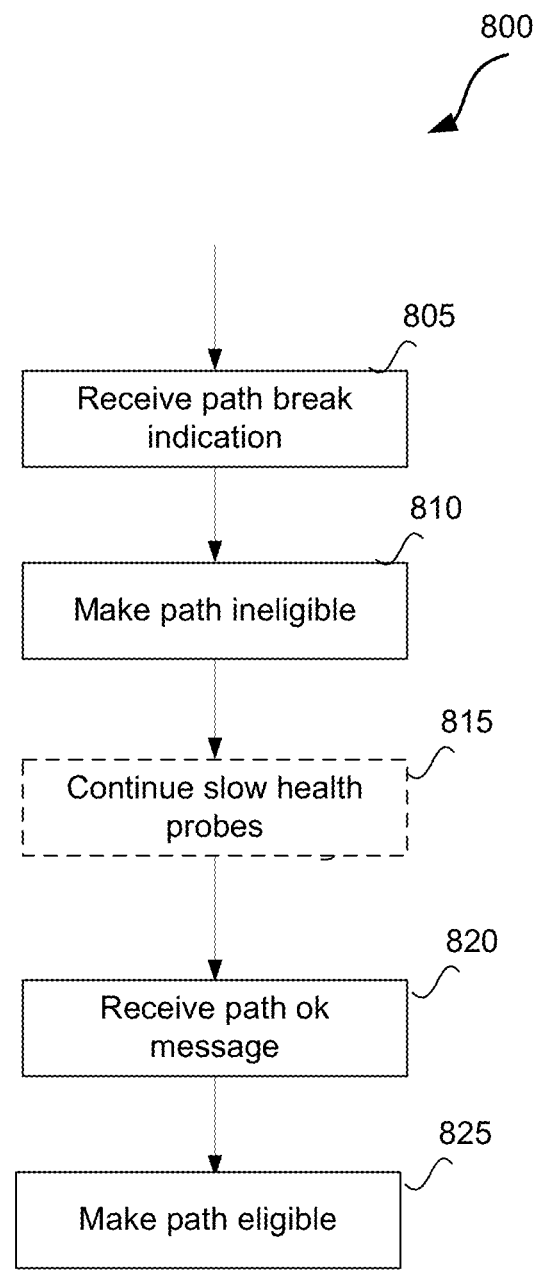
FIG. 8 depicts an exemplary flowchart for confirming a path break by a transmitting network appliance.

FIG. 8 depicts an exemplary flowchart 800 for confirming a path break by a transmitting appliance. In step 805, a transmitting appliance receives a path break indication from the receiving appliance. The transmitting appliance may then make the path ineligible for transmitting data in step 810. In some embodiments, the transmitting appliance may optionally continue to send slow health probes over the network path in step 815 to determine when the network path becomes operational again.

In step 820, a transmitting appliance may receive a path ok message from the receiving appliance. This indicates that the path is no longer in a path break condition, and the path can be determined to be eligible for data transmission again, in step 825. Once the path is eligible for transmission, metrics and classifications (such as described herein with reference to FIG. 4) may be used to determine which of the eligible paths will be used for a particular data transmission.

Figure 9:
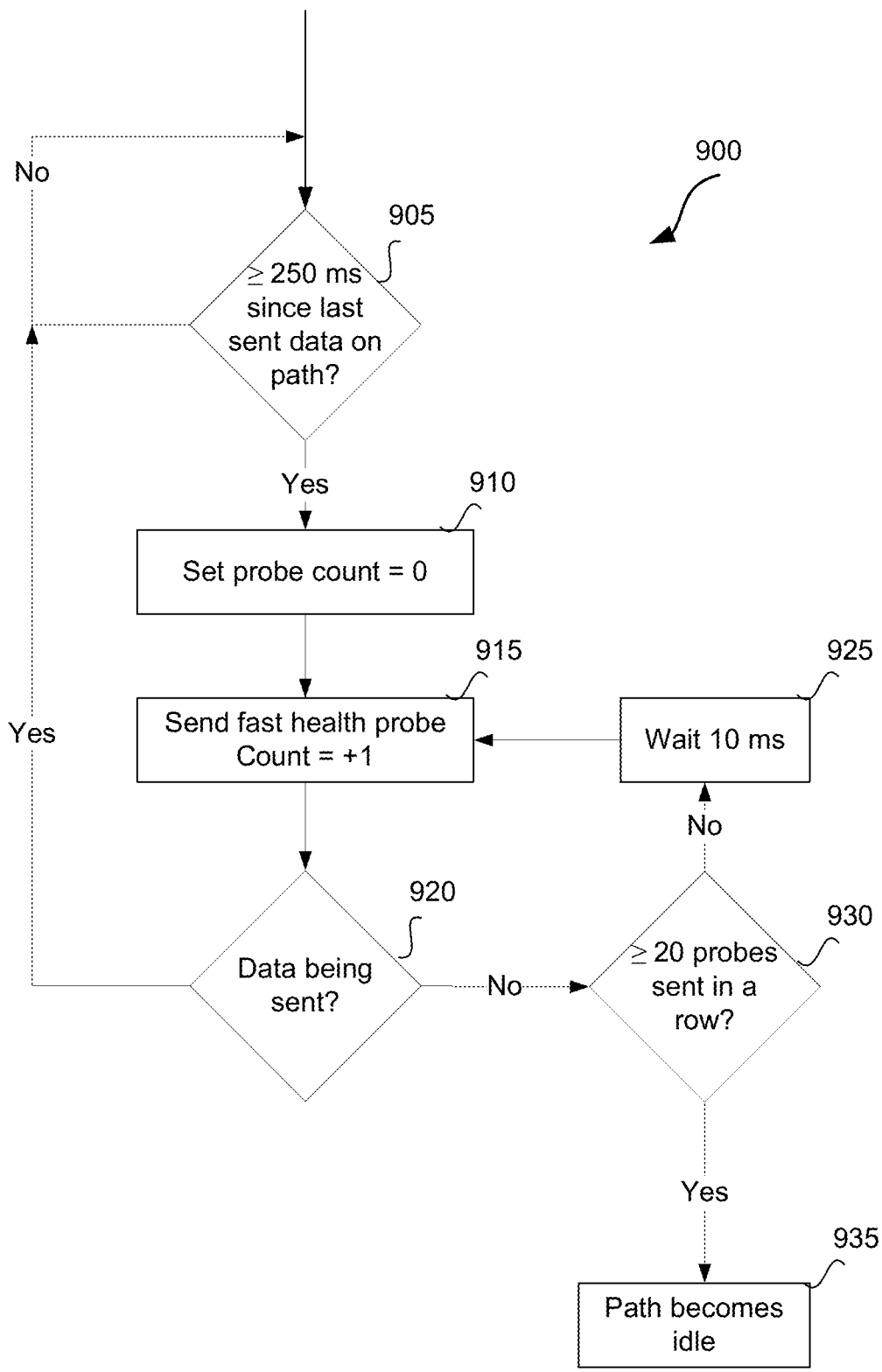
FIG. 9 depicts another exemplary flowchart for detecting a path break by a transmitting network appliance.

FIG. 9 depicts an exemplary flowchart 900 for a transmitting appliance to enable a receiving appliance to quickly detect a path break condition. The exemplary method of FIG. 9 may be utilized when a communication path is transitioning from an active state of data transmission to an idle state. In step 905, a transmitting appliance determines if at least 250 milliseconds have elapsed since the last data transmission over the network path (first time period). As discussed herein, the specific time interval can be greater than or less than 250 milliseconds in various embodiments. If at least 250 milliseconds have elapsed, then the transmitting appliance sets a health probe count to zero in step 910.

In step 915, a fast health probe is sent by the transmitting appliance and the probe counter is incremented by one. If data is being sent in step 920, then the method begins again at step 905. If no data is being sent in step 920, then the transmitting appliance continues to send up to 20 fast health probes at an interval of 10 milliseconds in steps 930 and 925. Again, there can be fewer or greater than 20 fast health probes in step 930, and the interval can be greater than or less than 10 milliseconds in step 925. The second time period, as discussed herein, may be defined by the summation of steps 925 and 930. That is, 20 health probes sent 10 milliseconds apart yields a second time period of 200 milliseconds.

After completing its data transmission, waiting the first time period, and sending the burst of health probes during the second time period, the path becomes idle in step 935. That is, the transmitting appliance has nothing further to transmit over the path and deems the path idle until such time as a subsequent data transmission begins over the path. Optionally, transmitting appliance can send slow health probes over the network path, while the path is idle.

In various embodiments, when a path is transitioning from an active state of data transmission to an idle state, the transmitting appliance may wait the first time period after finishing the data transmission, and then send a burst of health probes during the second time period that are much more closely spaced than other health probes that may be sent. That is, health probes may be sent at a faster rate than normal specifically when a path is transitioning from an active state to an idle state. Because the burst of probes is spaced very closely together (more closely than used in other scenarios to measure health of network components), less network bandwidth is utilized for health probes. Thus, a quick detection of path break conditions can be determined while minimizing network overhead usage for this purpose.

Thus, methods and systems for detecting a path break in a communication network are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for determining a break condition in a communication path by a receiver network appliance of a plurality of network appliances, the method comprising:
   during a first time period, receiving, by the receiver network appliance, a plurality of data packets from a transmitter network appliance via the communication path;
   upon completion of the first time period and completion of the transmission of the plurality of data packets, receiving, by the receiver network appliance, a burst of health probes during a second time period from the transmitter network appliance via the communication path; and
   unilaterally determining, by the receiver network appliance, that the transmission of the plurality of data packets has ended based on receiving the burst of health probes during the second time period that are not transmitted while the communication path is idle.

2. The method of claim 1, further comprising:
prior to receiving the burst of health probes, determining, by the receiver network appliance, that a delay or loss is present in the communication path; and
transmitting, by the receiver network appliance, a subsequent health probe to the transmitter network appliance.

3. The method of claim 1, further comprising:
determining, by the receiver network appliance, that the communication path is operational based on receiving the burst of health probes and the plurality of data packets.

4. The method of claim 1, further comprising:
not receiving a second burst of health probes while receiving the plurality of data packets from the transmitter network appliance via the communication path.

5. The method of claim 1, wherein the burst of health probes corresponds with four health probes.

6. The method of claim 1, wherein the burst of health probes corresponds with 10 to 50 health probes transmitted 10 milliseconds to 1 second apart.

7. The method of claim 1, wherein the first time period is less than one second.

8. The method of claim 1, wherein the communication path is a Multiprotocol Label Switching (MPLS), Internet, or Long Term Evolution (LTE) communication path.

9. The method of claim 1, wherein the first time period and the second time period are dynamically adjusted according to network conditions associated with the communication path.

10. A system for determining a break condition in a communication path by a receiver network appliance of a plurality of network appliances, the system comprising:
a memory; and
one or more processors that are configured to execute machine readable instructions stored in the memory to:
during a first time period, receive a plurality of data packets from a transmitter network appliance via the communication path;
upon completion of the first time period and completion of the transmission of the plurality of data packets, receive a burst of health probes during a second time period from the transmitter network appliance via the communication path; and
unilaterally determine that the transmission of the plurality of data packets has ended based on receiving the burst of health probes during the second time period that are not transmitted while the communication path is idle.

11. The system of claim 10, wherein the instructions further to:
prior to receiving the burst of health probes, determine that a delay or loss is present in the communication path; and
transmit a subsequent health probe to the transmitter network appliance.

12. The system of claim 10, wherein the instructions further to:
determine that the communication path is operational based on receiving the burst of health probes and the plurality of data packets.

13. The system of claim 10, wherein the instructions further to:
not receive a second burst of health probes while receiving the plurality of data packets from the transmitter network appliance via the communication path.

14. The system of claim 10, wherein the burst of health probes corresponds with four health probes.

15. The system of claim 10, wherein the burst of health probes corresponds with 10 to 50 health probes transmitted 10 milliseconds to 1 second apart.

16. The system of claim 10, wherein the first time period is less than one second.

17. The system of claim 10, wherein the communication path is a Multiprotocol Label Switching (MPLS), Internet, or Long Term Evolution (LTE) communication path.

18. The system of claim 10, wherein the first time period and the second time period are dynamically adjusted according to network conditions associated with the communication path.

19. A non-transitory computer-readable storage medium storing a plurality of instructions executable by one or more processors, the plurality of instructions when executed by the one or more processors cause the one or more processors to:
during a first time period, receive a plurality of data packets from a transmitter network appliance via the communication path;
upon completion of the first time period and completion of the transmission of the plurality of data packets, receive a burst of health probes during a second time period from the transmitter network appliance via the communication path; and
unilaterally determine that the transmission of the plurality of data packets has ended based on receiving the burst of health probes during the second time period that are not transmitted while the communication path is idle.

* * * * *